US011457435B2

United States Patent
Chen et al.

(10) Patent No.: US 11,457,435 B2
(45) Date of Patent: *Sep. 27, 2022

(54) RESOURCE CONFIGURATION FOR EPDCCH

(71) Applicant: Texas Instruments Incorporated, Dallas, TX (US)

(72) Inventors: Runhua Chen, Plano, TX (US); Ralf Matthias Bendlin, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,699

(22) Filed: Jul. 8, 2019

(65) Prior Publication Data

US 2019/0335432 A1    Oct. 31, 2019

Related U.S. Application Data

(63) Continuation of application No. 15/707,741, filed on Sep. 18, 2017, now Pat. No. 10,349,396, which is a (Continued)

(51) Int. Cl.
*H04W 72/02* (2009.01)
*H04W 72/04* (2009.01)
(Continued)

(52) U.S. Cl.
CPC ......... *H04W 72/042* (2013.01); *H04L 1/0046* (2013.01); *H04W 28/26* (2013.01); *H04W 72/00* (2013.01)

(58) Field of Classification Search
CPC .. H04W 72/042; H04L 1/0046; H04L 5/0053; H04L 1/0031; H04L 1/1896
See application file for complete search history.

(56) References Cited

U.S. PATENT DOCUMENTS

2009/0130985 A1    5/2009 Lee et al.
2012/0113844 A1    5/2012 Krishnamurthy
(Continued)

OTHER PUBLICATIONS

Prosecution History, U.S. Appl. No. 13/743,202, filed Jan. 16, 2013, 564 pages.
(Continued)

*Primary Examiner* — Anez C Ebrahim
(74) *Attorney, Agent, or Firm* — Gregory J. Albin; Charles A. Brill; Frank D. Cimino

(57) ABSTRACT

A system and method for providing both localized and distributed transmission modes for EPDCCH is disclosed, where one EPDCCH comprises of one or multiple CCEs. Localized versus distributed transmission may be defined in terms of the EPDCCH to CCE resource mapping. In a localized transmission CCEs are restricted to be contained within one PRB. In a distributed transmission a CCE spans over multiple PRBs. A UE can be configured to either receive the EPDCCH only in localized or only in distributed transmissions. A UE can also be configured to expect EPDCCH transmissions in both localized and distributed transmissions. In each PRB configured by the higher layer as an EPDCCH resource, 24 REs that may be used for any DMRS transmission are always reserved and not used for EPDCCH transmission.

13 Claims, 4 Drawing Sheets

Related U.S. Application Data continuation of application No. 13/743,202, filed on Jan. 16, 2013, now Pat. No. 9,769,806.

(60) Provisional application No. 61/645,323, filed on May 10, 2012, provisional application No. 61/642,763, filed on May 4, 2012, provisional application No. 61/587,194, filed on Jan. 17, 2012.

(51) Int. Cl.
*H04L 1/00* (2006.01)
*H04W 28/26* (2009.01)
*H04W 72/00* (2009.01)

(56) References Cited

U.S. PATENT DOCUMENTS

| | | | |
|---|---|---|---|
| 2012/0201187 A1* | 8/2012 | Koo | H04L 1/0027 370/312 |
| 2013/0034064 A1* | 2/2013 | Nam | H04L 5/0091 370/329 |
| 2013/0083666 A1 | 4/2013 | Gaal | |
| 2014/0071952 A1 | 3/2014 | Kim et al. | |
| 2014/0126487 A1* | 5/2014 | Chen | H04L 1/0038 370/329 |
| 2015/0305059 A1 | 10/2015 | Li et al. | |

OTHER PUBLICATIONS

Prosecution History, U.S. Appl. No. 15/707,741, filed Sep. 18, 2017,155 pages.

* cited by examiner

RESOURCE CONFIGURATION FOR EPDCCH

CROSS-REFERENCE TO RELATED APPLICATIONS

The present application is a continuation of U.S. application Ser. No. 15/707,741 filed Sep. 18, 2017; which is a continuation of U.S. application Ser. No. 13/743,202 filed Jan. 16, 2013 (now U.S. Pat. No. 9,769,806), which also claims the benefit of the filing date of U.S. provisional patent application No. 61/587,194, filed Jan. 17, 2012; U.S. provisional patent application No. 61/642,763, filed May 4, 2012; and U.S. provisional patent application No. 61/645,323, filed May 10, 2012, the disclosures of which are hereby incorporated herein by reference in their entireties.

BACKGROUND

In LTE networks, downlink control information (DCI) is transmitted to user equipment (UE) in the Physical Downlink Control Chanel (PDCCH). The LTE UE obtains the resource allocations for uplink and downlink transmissions from the PDCCH. The PDCCH onto which the DCI is mapped has different formats and depending on its size is transmitted in one or more control channel elements (CCE). A CCE corresponds to thirty-six resource elements (REs).

In LTE Release 8-10, legacy PDCCH is transmitted and demodulated based on cell-specific reference signals (CRS). A legacy PDCCH is precoded with transmit diversity on 1/2/4 CRS antenna ports, cross-interleaved with other PDCCHs, and then distributed over the entire system bandwidth in the legacy control region of a subframe. The legacy control region comprises of the first K orthogonal frequency division multiplexing (OFDM) symbols in the first slot of a subframe, where K=1, 2, 3 for system bandwidths greater than 10 Physical Resource Blocks (PRBs), and K=2, 3, 4 otherwise. The control region size K is signaled in the Physical Control Format Indicator Channel (PCFICH). Through CRS-based transmit diversity and cross-interleaving, legacy PDCCH exploits spatial and frequency diversity to achieve robustness and ensures its reliable reception and cell coverage.

In LTE Release 10, a new PDCCH transmission scheme is introduced for the relay backhaul link, called R-PDCCH. R-PDCCH inherits all the DCI formats of legacy LTE systems (i.e., DCI formats 0, 1, 1A, 1B, 1C, 1D, 2, 2A, 2B, 2C, 4). R-PDCCH is transmitted in the Physical Downlink Shared Channel (PDSCH) region to exploit higher control channel capacity. R-PDCCH can be transmitted with both CRS-based and Demodulation Reference Signal (DMRS)-based transmission. For DMRS-based R-PDCCH, transmission is based on single-layer beamforming on DMRS antenna port 7 with a scrambling ID (SCID) of 0. R-PDCCH is transmitted in 1/2/4/8 Virtual Resource Blocks (VRBs), which are dynamically selected from a subset of $N_{VRB}^{R-PDCCH}$ VRBs semi-statically configured by a higher layer.

An enhanced PDCCH (EPDCCH) is introduced in LTE Release 11 to expand on R-PDCCH. Similar to R-PDCCH, the EPDCCH is transmitted in the PDSCH region to achieve higher control channel capacity. The higher layer configures a set of PRBs as the EPDCCH resources. The PRBs provide a physical grouping of subcarriers and OFDM symbols. The EPDCCH reuses the concept of CCEs to map the EPDCCH onto the PRBs configured by the higher layer for EPDCCH transmission. Demodulation of EPDCCH is based on DMRS transmitted in the PRBs that are used for transmission of the enhanced control channel. EPDCCH is not demodulated by CRS such that it can be transmitted in non-backward-compatible carriers and Multicast-Broadcast Single Frequency Network (MBSFN) subframes. Antenna ports 7-10 or subsets thereof are used with EPDCCH.

SUMMARY OF THE INVENTION

A system and method for providing both localized and distributed transmission modes for EPDCCH is disclosed, where one EPDCCH comprises of one or multiple CCEs. Localized versus distributed transmission may be defined in terms of the EPDCCH to CCE resource mapping. In a localized transmission CCEs are restricted to be contained within one PRB. In a distributed transmission a CCE spans over multiple PRBs. A UE can be configured to either receive the EPDCCH only in localized or only in distributed transmissions. A UE can also be configured to expect EPDCCH transmissions in both localized and distributed transmissions. In each PRB configured by the higher layer as an EPDCCH resource, 24 REs that may be used for any DMRS transmission are always reserved and not used for EPDCCH transmission.

BRIEF DESCRIPTION OF THE DRAWINGS

Figure 1:
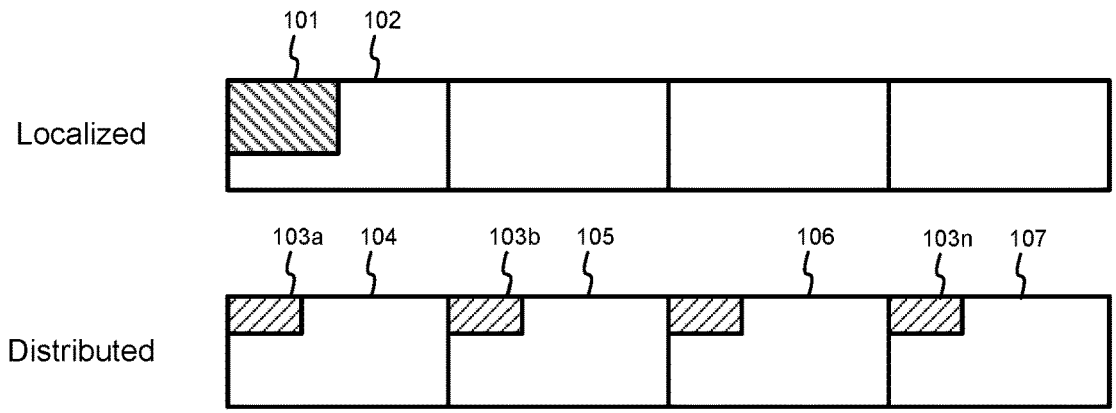

Having thus described the invention in general terms, reference will now be made to the accompanying drawings, wherein:

FIG. 1 illustrates localized versus distributed transmission of EPDCCH according to one embodiment.

Figure 2:
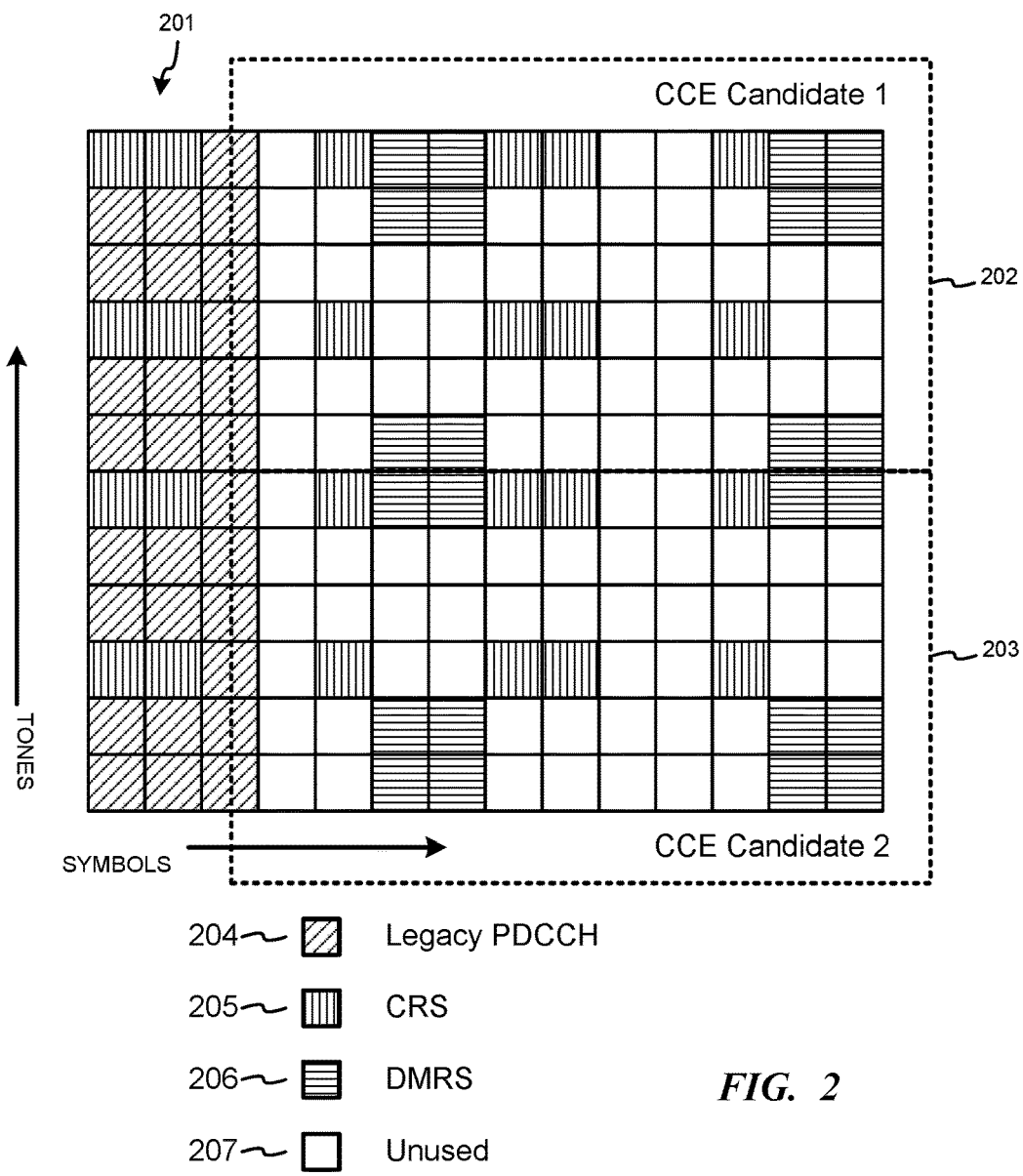

FIG. 2 illustrates one physical resource block consisting of two (M=2) CCE candidates.

Figure 3:
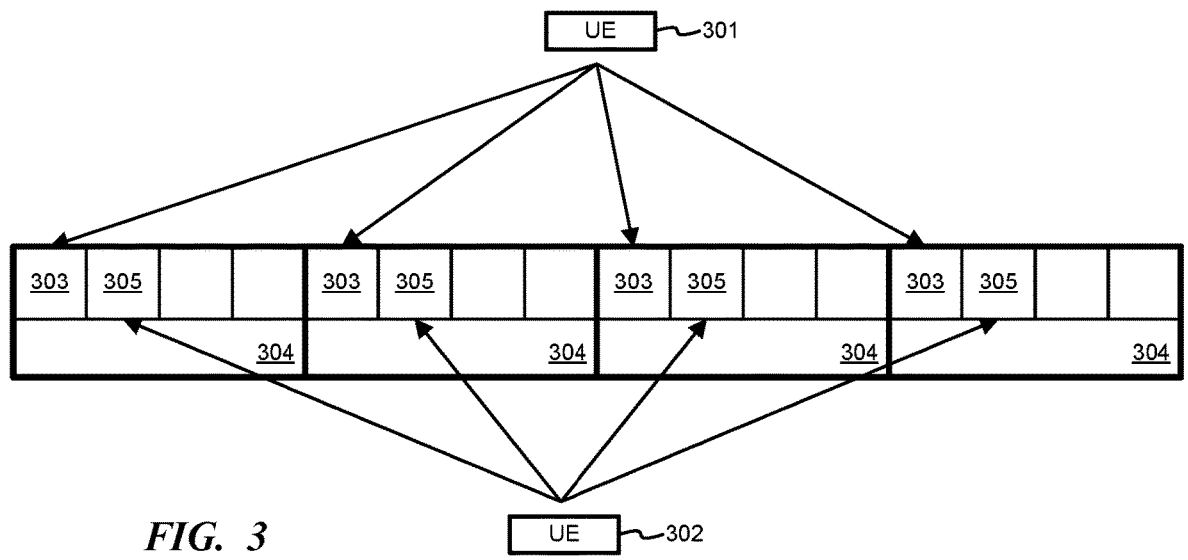

FIG. 3 illustrates distributed mapping of EPDCCH for multiple UEs according to one embodiment.

Figure 4:
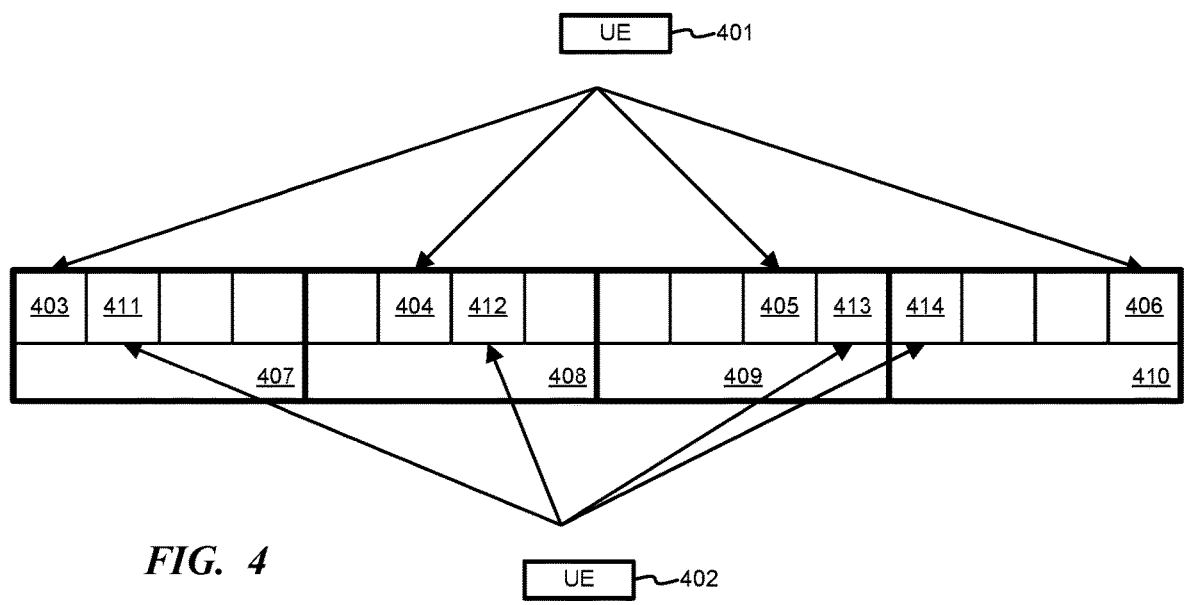

FIG. 4 illustrates distributed mapping of EPDCCH for multiple UEs according to another embodiment.

Figure 5:
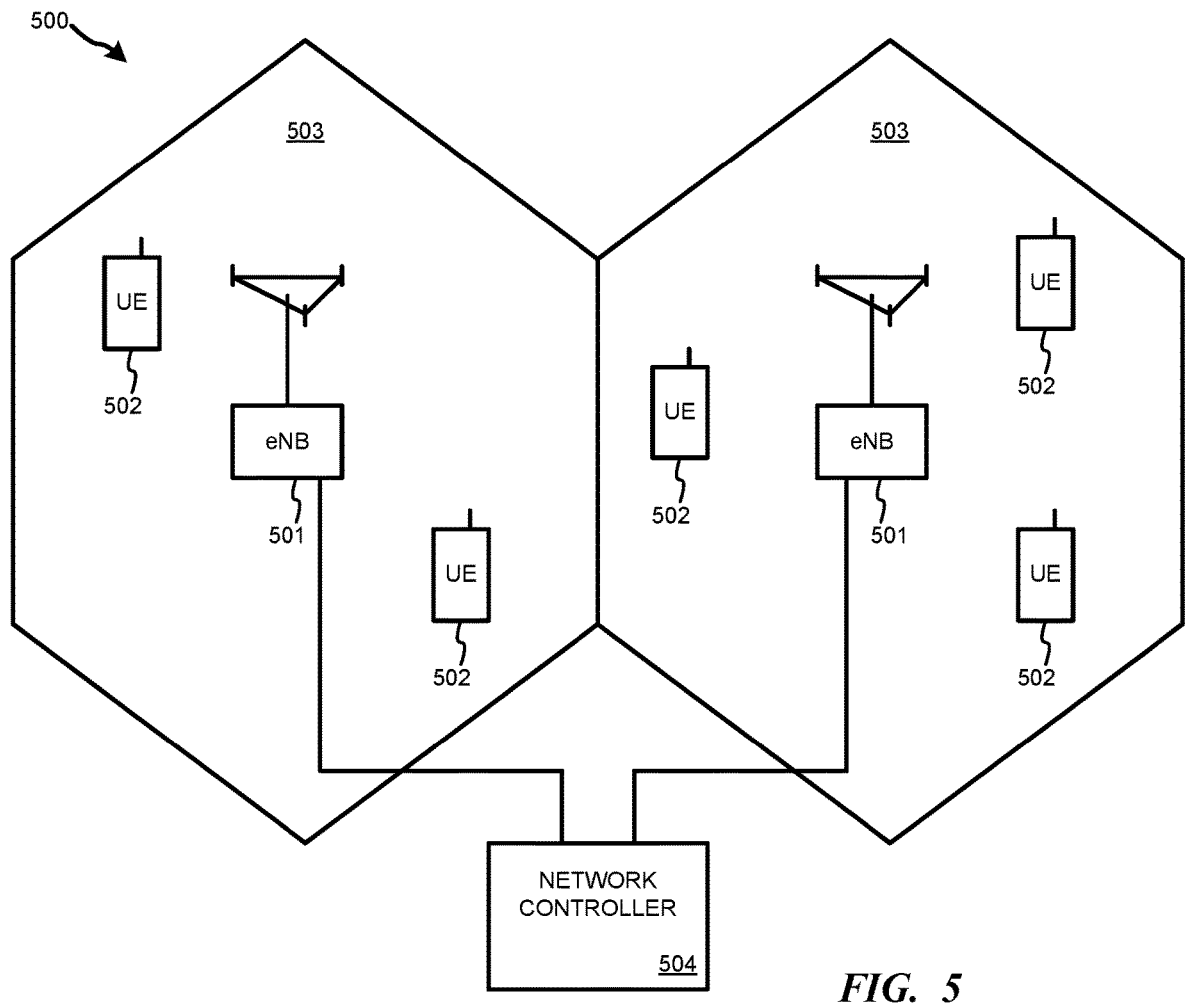

FIG. 5 is a block diagram of a wireless communication network.

Figure 6:
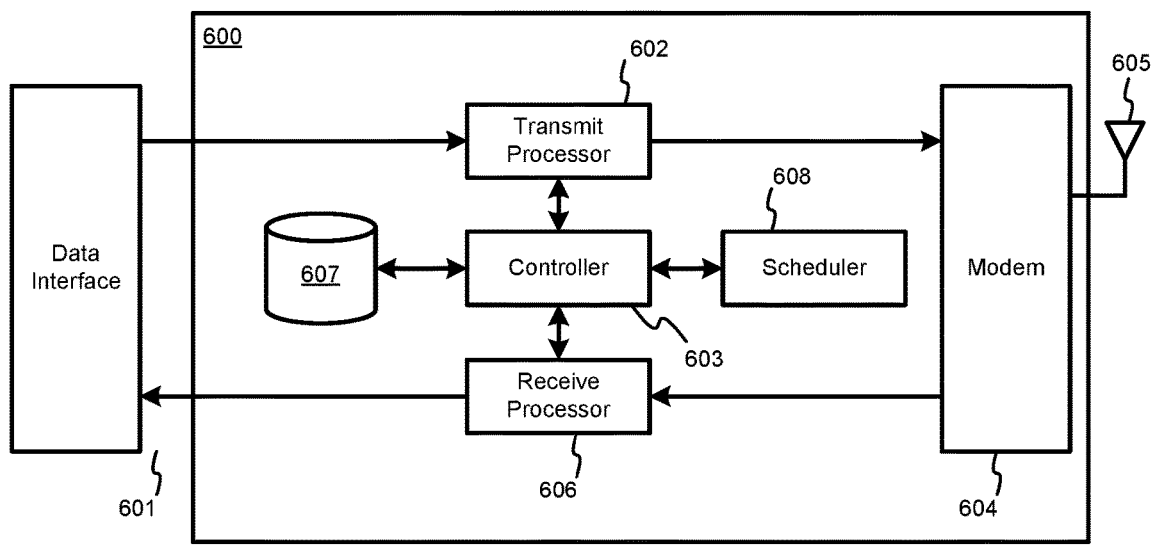

FIG. 6 is a high level block diagram of a system that may be used as an eNB or UE.

Figure 7:
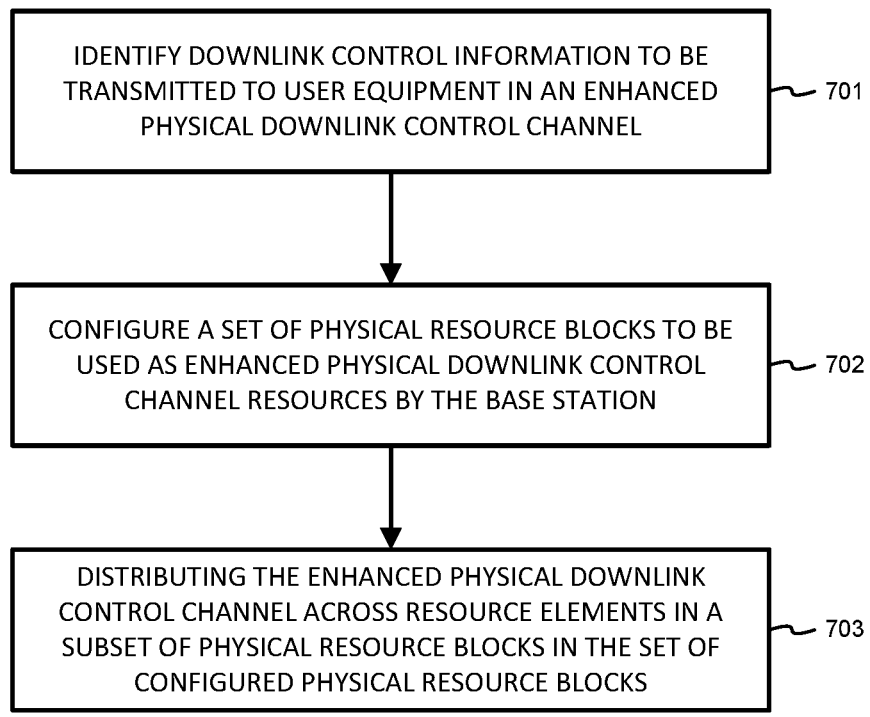

FIG. 7 is a flowchart illustrating a method or process for mapping EPDCCH to physical resource blocks in a base station according to one embodiment.

Figure 8:
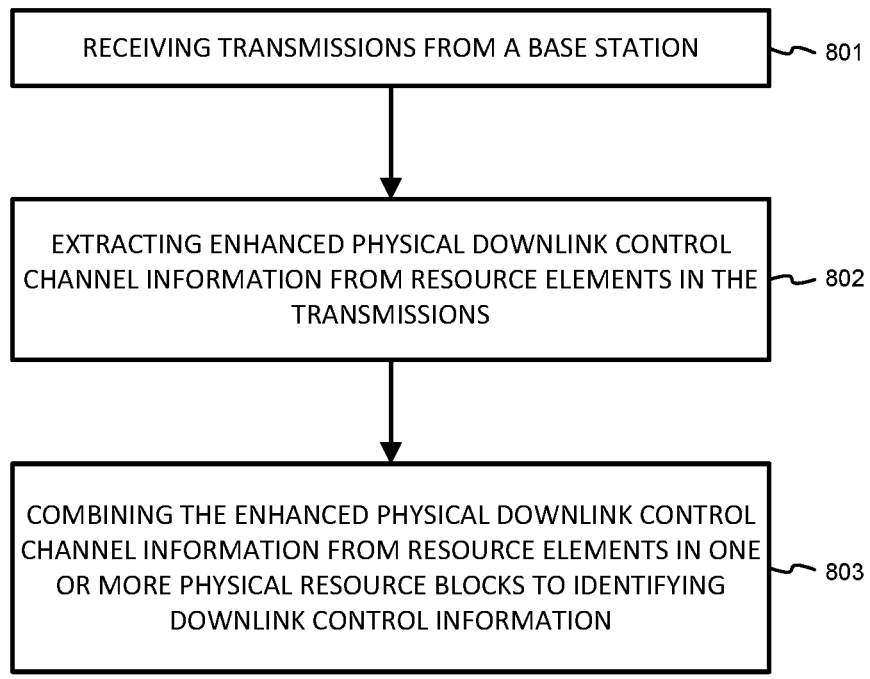

FIG. 8 is a flowchart illustrating a method or process for receiving EPDCCH in PRBs at a UE according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Both localized and distributed transmission modes are possible for EPDCCH. Localized transmission is primarily used to reap scheduling gain (e.g. in frequency-selective channels) and beamforming gain (e.g. in correlated antenna setup). Distributed transmission is mainly used to achieve diversity gain and to improve link robustness (e.g. in uncorrelated antenna setup and at high Doppler where CSI feedback is unreliable). The difference between "localized" and "distributed" transmissions may be defined in different ways.

In one definition, localized versus distributed transmission is defined in terms of the EPDCCH resource configuration. If the configured EPDCCH PRB resources are adjacent in the frequency domain, it is a localized transmission. When the PRB resources are not adjacent, it is a distributed transmission.

Since the EPDCCH PRB resources are semi-statically configured by a higher layer, it does not matter from the EPDCCH demodulation perspective whether the PRBs are adjacent in frequency or not. UE behavior would be exactly the same in both cases. Because the 3GPP specification is defined in terms of UE behavior, it is unclear if such a definition warrants two EPDCCH transmission schemes in the specification.

In another definition, localized vs. distributed is defined in terms of EPDCCH resource mapping. With distributed transmission, an EPDCCH for a particular user is transmitted across a set of PRBs even if a smaller set of PRBs would be sufficient for transmitting that EPDCCH. With localized transmission, an EPDCCH is transmitted in the smallest number of PRBs required for transmitting that EPDCCH.

FIG. 1 illustrates localized versus distributed transmission of EPDCCH according to one embodiment. For localized transmission, EPDCCH 101 for a particular user is restricted to the minimum set of PRBs 102 (i.e., one PRB) required to transmit the control information intended for that user. With distributed transmission, EPDCCH 103 for a particular user is transmitted in pieces 103a-n that are spread across a set of PRBs 104-107. EPDCCH 103 is divided across each of PRBs 104-107 even if a smaller set of PRB would be sufficient for transmitting that EPDCCH 103 (e.g., one PRB).

A direct result of this mapping is that one PRB may be shared by multiple EPDCCHs. In either the localized or the distributed case, each PRB may contain a part of multiple EPDCCHs. This second definition is used herein for defining localized and distributed modes.

To distribute an EPDCCH into multiple PRBs, the EPDCCH is divided into smaller resource units. An EPDCCH is divided into multiple control channel elements (CCE), each of which comprises of a set of resource elements (RE), e.g., thirty-six. Optionally, each CCE can be further divided into smaller-size resource element groups (REG) each comprising a fixed number of resource elements. As a result, distributed transmission may be achieved by distributing the EPDCCH CCEs/REGs into multiple PRBs. In order to achieve more frequency diversity, the CCEs/REGs can further be interleaved before being distributed to the PRBs.

One method for EPDCCH resource assignment is through semi-static radio resource control (RRC) configuration, where the set of CCE/REG resources to which an EPDCCH is mapped are higher-layer configured semi-statically and UE-specifically. On the other hand, it is possible for the set of CCE/REG resources on which an EPDCCH is mapped to be dynamically adapted across different subframes. That is, an eNodeB higher layer semi-statically signals a set of EPDCCH configuration parameters, while the exact CCE/REG resources for a particular EPDCCH in each subframe vary as a function of the semi-statically signaled configuration parameters and other dynamic parameters (e.g., subframe index, UE-ID, etc.). This further increases the EPDCCH diversity.

The CCE/REG resources in the configured EPDCCH PRB resources may be indexed using different methods as described below.

In one embodiment, the CCEs/REGs are continuously numbered within each PRB and across different PRBs. For example, assume each PRB has two CCEs. The CCEs in a first PRB are numbered "CCE1" and "CCE2," and the CCEs in the next PRB are numbered as "CCE3" and "CCE4."

In another embodiment, the CCE/REG resources corresponding to the same CCE/REG position in each PRB are continuously numbered. For example, assume two PRBs are configured as EPDCCH resources and each PRB has two CCEs. The CCEs in the first PRB are numbered as "CCE1" and "CCE3," and the CCEs in the second PRB are numbered as "CCE2" and "CCE4."

Similarly, the same principles may be used to map CCEs/REGs for a particular user/DCI to the available CCE/REG resources. In one embodiment, the CCEs/REGs in an EPDCCH are first mapped in the dimension of available CCE/REG resources within a PRB, and then mapped to additional PRBs if more control resources are needed. This may be suitable for localized transmission, for example. In another embodiment, the CCEs/REGs in an EPDCCH are first mapped in the frequency dimension along the configured PRBs resources, and then mapped in the dimension of CCE/REG resources. Such frequency-first mapping achieves more frequency diversity and re-uses existing PDSCH design principles.

The CCE/REG resources in each PRB may be calculated assuming that a 3-8 layer DMRS pattern (24 REs/PRB) is always reserved and not used for EPDCCH transmission. This is because a UE does not know the DMRS pattern for PDSCH transmission prior to receiving any EPDCCH. In other words, even if the actual EPDCCH transmission to one UE uses 2-layer DMRS, which incurs 12 REs/PRB DMRS overhead, EPDCCH transmission shall always exclude the 24 REs/PRB DMRS pattern that may be used for 3-8 layer DMRS transmission to any UE.

Similarly, the available CCE/REG resources in each PRB should be calculated assuming that certain resources (such as, for example, channel state information reference signals (CSI-RS) and CRS) are reserved and not used for EPDCCH transmission. Also, if additional enhanced control channels (e.g., enhanced Physical Hybrid-ARQ Indicator Channel (EPHICH), enhanced Physical Control Format Indicator Channel (EPCFICH), or enhanced Physical Broadcast Channel (EPBCH)) are introduced, the resources occupied by such enhanced control signals should be reserved and not used for EPDCCH transmission.

For the sake of discussion herein, assume that one EPDCCH comprises of L CCEs where each CCE comprises some number of resource elements (e.g., 36 resource elements per CCE). L may typically take on values from the set {1, 2, 4, 8}, although other values of L are also possible. It is possible that the CCE formation is different for localized and distributed EPDCCH. For example, a CCE may be restricted to one PRB for localized EPDCCH transmission, but may be allowed to span over multiple PRBs for distributed EPDCCH transmission.

The resource elements available for EPDCCH transmission in each PRB are grouped into M "CCE candidates". Each CCE candidate contains a set of one or more resource elements.

FIG. 2 illustrates one PRB 201 consisting of two (M=2) CCE candidates 202, 203. PRB 201 consists of twelve tones having fourteen OFDM symbols per tone. Certain resource elements in PRB 201 are not available for EPDCCH transmission, such as resource elements being used for legacy PDCCH 204, CRS 205, or DMRS 206 amongst others. The blank resource elements (i.e., REs 207) in each CCE candidate 202, 203 may be used for EPDCCH transmission. Additionally, any blank resource elements 207 that are not used for EPDCCH transmission (i.e., orphan REs) may be used for transmitting other signals, such as PDSCH, EPHICH, EPCFICH, or EPBCH.

It will be understood that in other embodiments, PRB 201 may be divided into more than two CCE candidates. Additionally, other reference signals (e.g., CSI-RS) may be assigned to the blank resource elements in PRB 201, which would need to be considered when mapping EPDCCH.

The LTE DMRS pattern contains two orthogonal code division multiplexed (CDM) groups. It is necessary for each CCE candidate to be associated with at least one set of DMRS, preferably CDM group 1, so that demodulation is possible. It is also desirable for each CCE candidate to have the same DMRS symbol density on each DMRS antenna port so that channel estimation performance is balanced.

An EPDCCH of aggregation level L should be mapped to L CCE candidates in the EPDCCH control resources, either in one or multiple PRBs. The UE needs to know the position of the assigned CCE candidates in each PRB in order to decode EPDCCH. This is discussed below separately for localized transmission and distributed transmission.

Alternatively, orphan REs can be used to facilitate frequency domain intercell interference coordination (ICIC). For example, twenty-four REs may be reserved for DMRS within a PRB-pair that is used to transmit EPDCCH. If only twelve of the reserved REs are actually used to transmit DMRS, then the other twelve REs in that PRB-pair, which are not used for DMRS, EPDCCH, or any other signals or channels, remain unused. In one embodiment, one transmission point may configure twelve REs for antenna ports 7/8 in the PRB-pair (twelve REs corresponding to antenna ports 9/10 in that PRB-pair have zero-power). Assuming the two transmission points are synchronized in time and frequency, another transmission point may configure twelve REs for antenna ports 9/10 in the same PRB-pair (twelve REs corresponding to APs 7/8 in that PRB-pair have zero-power). Accordingly, due to the orthogonal zero-power orphan REs from each transmission point, the DMRS REs experience reduced intercell interference resulting in improved channel estimates and an overall improved system performance.

If all 24 DMRS REs are always reserved in a PRB-pair used for EPDCCH, ICIC can be configured for both localized and distributed transmissions. In one embodiment, one transmission point may use distributed transmission with transmit diversity on antenna ports 7/8, and another transmission point may use localized transmission with M=2 CCE candidates associated with antenna ports 9/10.

With localized transmission, an EPDCCH is mapped to as few PRBs as possible. For example, L CCEs of one EPDCCH are mapped to L CCE candidates in one EPDCCH PRB resource. As noted above, each PRB comprises M CCE candidates. The EPDCCH may be mapped as follows in one embodiment:

If L≤M, then EPDCCH is mapped to one PRB and occupies the first L available CCE candidates. Alternatively, it is also possible that the L CCE candidates on which the L CCEs are mapped to are configured by a higher layer.

If L>M, then EPDCCH is mapped to $\lceil L/M \rceil$ PRB. In each of the first ($\lceil L/M \rceil$−1) PRBs, all M CCEs are used for EPDCCH mapping. In the last PRB, (L−($\lceil L/M \rceil$−1)×M) CCEs are used for EPDCCH mapping.

It is also possible for CCE mapping to use a mechanism similar to LTE Release 8 PDCCH mapping. Assume that the EPDCCH control region consists of a set of CCE candidates numbered from 0 to $N_{CCE}$−1, where $N_{CCE}$ is the total number of CCE candidates in the configured EPDCCH PRB resources. The set of EPDCCH candidates to monitor are defined in terms of search spaces, where a search space $S_k^{(L)}$ at aggregation level L∈{1,2,4,8} is defined by a set of EPDCCH candidates. The CCE candidates corresponding to EPDCCH candidate M of the search space $S_k^{(L)}$ are given by $$L\{(Y_k+m') \bmod \lfloor N_{CCE}/L \rfloor\}+i \qquad \text{(Eq. 1)}$$

where $Y_k$ is a hashing parameter as a function of higher-layer configuration, I=0, . . . , L−1, and m'=m, where m=0, . . . , $M^{(L)}$−1. $M^{(L)}$ is the number of EPDCCH candidates to monitor in the given search space. An example of $M^{(L)}$ is given Table 1.

TABLE 1

| Search space $S_k^{(L)}$ | | Number of EPDCCH candidates $M^{(L)}$ |
|---|---|---|
| Aggregation level L | Size [in CCEs] | |
| 1 | 6 | 6 |
| 2 | 12 | 6 |
| 4 | 8 | 2 |
| 8 | 16 | 2 |

With distributed transmission, one EPDCCH is distributed into multiple PRBs and occupies a set of resource elements in each PRB even though fewer PRBs (including just a single PRB) might suffice. The EPDCCH may be mapped to PRB using several different schemes.

In one embodiment, the EPDCCH for a UE is mapped to N CCE candidates in each PRB. The value of N may be fixed or semi-statically and UE-specifically configured by a higher layer. Hence one EPDCCH is mapped to $\lceil L/N \rceil$ PRBs. It is possible for N to be dynamically adapted dependent on a subframes/PRB index. For each UE, the set of N CCE candidates in each PRB on which an EPDCCH is mapped semi-statically may be configured by higher-layer RRC signaling.

FIG. 3 illustrates distributed mapping of EPDCCH for UEs 301 and 302 according to one embodiment. In this example, the N CCE candidates used for EPDCCH transmission may be fixed in each PRB in a UE-specific manner. For example, UE 301 may be configured to perform blind decoding of EPDCCH of aggregation level L, assuming EPDCCH is mapped to the first CCE candidate 303 in every PRB 304. UE 304 may be configured to blind decode EPDCCH mapped to the second CCE 305 candidate in each PRB 304. As noted above, instead of dividing the PRB into multiple CCE candidates, the PRB can be divided into other resource units, such as multiple REGs, in other embodiments. Accordingly, UEs 301 and 302 may also decode EPDCCH spread across REGs in every PRB.

To further improve the frequency diversity, the CCE candidate used for EPDCCH transmission may be dynamically adapted dependent on the PRB index or subframe index, for example, following a pre-determined hopping pattern or cycling pattern. Assuming EPDCCH of aggregation level L is mapped to L/2 PRBs and occupies N=2 CCE candidates in each PRB. The index of N CCE candidates used for EPDCCH transmission in the l-th PRB could be determined as $$l_m, \ldots, l_m+N-1 \qquad \text{(Eq. 2)}$$

where $$l_m = \mathrm{mod}(l+\lfloor M/N \rfloor \times N, M). \quad \text{(Eq. 3)}$$

For example, referring to FIG. 4, a first UE 401 may be configured to perform blind decoding of EPDCCH mapped to the 1st/2nd/3rd/4th CCE or REG candidates (i.e., 403-406, respectively) in the 1st/2nd/3rd/4th PRBs (i.e., 407-410, respectively). A second UE 402 may be configured to blind decode EPDCCH mapped to 2nd/3rd/4th/1st CCE or REG candidates (i.e., 411-416, respectively) in the 1st/2nd/3rd/4th PRBs (407-410, respectively).

A UE may be semi-statically configured to monitor either localized EPDCCH or distributed EPDCCH. For each UE, the eNodeB can configure one of {0,1,2} sets of physical resources for EPDCCH transmission. Moreover, the eNodeB can configure a UE to either receive the EPDCCH only in localized or only in distributed transmissions. This is possible because the channel characteristics (e.g. antenna correlation, UE mobility) do not change quickly. Therefore, it is not necessary for a UE to monitor both localized and distributed EPDCCH simultaneously.

Alternatively, the eNodeB can configure a UE to expect EPDCCH transmissions in both localized and distributed transmissions, i.e., it is possible for a UE to monitor both localized and distributed ePDCCH, in different search spaces.

The EPDCCH can be transmitted in a subset of PRBs configured for EPDCCH transmission allowing for coordination among eNodeBs to reduce inter-cell interference. The EPDCCH harnesses multi-user diversity and beamforming gains to increase robustness and system performance.

FIG. 5 is a block diagram of a wireless communication network 500, which may be an LTE network. LTE utilizes OFDM on the downlink and single-carrier frequency division multiplexing (SC-FDM) on the uplink. LTE partitions system bandwidth into multiple orthogonal subcarriers, which may be referred to as tones or bins. Each subcarrier may be modulated with data, control or reference signals. The wireless network 500 includes a number of evolved Node Bs (eNBs) 501 and other network entities. The eNBs 501 communicate with user equipment devices (UEs) 502. Each eNB 501 provides communication services for a particular geographic area or "cell" 503, which may be a macro cell, a pico cell, a femto cell, and/or other types of cell. A network controller 504 may couple to a set of eNBs 501 and provide coordination and control for these eNBs 501.

UEs 502 may be stationary or mobile and may be located throughout the wireless network 500. UEs 502 may be referred to as a terminal, a mobile station, a subscriber unit, a station, such as a mobile telephone, a personal digital assistant (PDA), a wireless modem, a laptop or notebook computer, a tablet, and the like. A UE 502 communicates with an eNBs 501 serving the cell 503 in which the UE 502 is located.

FIG. 6 is a high level block diagram of a system 600 that may be used as an eNB or UE, which may be, for example, an eNBs 501 or UEs 502 in FIG. 5. System 600 receives data to be transmitted from an interface 601 at transmit processor 602. The data may include, for example, audio or video information or other data file information to be transmitted. The transmit processor 602 may also receive control information, such as EPDCCH, PCFICH, PHICH, or PDCCH, from a controller 603. Transmit processor 602 processes (e.g., encode and symbol map) the data and control information to obtain data symbols and control symbols. The transmit processor 602 may also perform spatial processing or precoding on the data symbols and/or the control symbols. The output of the transmit processor 602 is provided to a modem 604. Modem 604 processes the output symbol stream to obtain an output sample stream that is further processed by converting to analog, amplifying, and upconverting before being transmitted via antenna 605. In other embodiments, multiple modems 604 may be used to support multiple-input multiple-output (MIMO) transmission on multiple antennas 605.

Signals are also received at system 600 on antenna 605 from other devices. The received signals are provided to modem 604 for demodulation. Modem 604 processes the signals by filtering, amplifying, downconverting, and/or digitizing, for example, to obtain input samples. Modem 604 or a receive processor 606 may further process the input samples to obtain received symbols. Receive processor 606 then processes the symbols by demodulating, deinterleaving, and/or decoding, for example. Receive processor 605 then provides decoded data to interface 601 for use by the eNB or UE. Receive processor further provides decoded control information to controller 603.

Controller 603 may direct the operation of system 600 in the eNB or UE, such as by mapping EPDCCH to PRBs (i.e., in an eNB) or monitoring localized and distributed EPDCCH in different search spaces (i.e., in a UE). A memory 607 may store data and program codes for controller 603, transmit processor 602, and/or receive processor 606. Additional components, such as a scheduler 608 may schedule downlink and/or uplink data transmission by system 600 (e.g., in an eNB).

FIG. 7 is a flowchart illustrating a method or process for mapping EPDCCH to physical resource blocks in a base station according to one embodiment. In step 701, downlink control information to be transmitted to user equipment in an enhanced physical downlink control channel is identified. In step 702, a set of physical resource blocks to be used as enhanced physical downlink control channel resources are configured by the base station. In step 703, the enhanced physical downlink control channel is distributed across resource elements in a subset of the physical resource blocks in the set of physical resource blocks.

The downlink control information may be transmitted using two or more physical resource blocks even if a single physical resource block is sufficient for transmitting the downlink control information. In one embodiment, at least one PRB is shared by two or more EPDCCHs. In another embodiment, each of the set of PRBs contains a part of multiple EPDCCHs. The set of PRBs may be limited to a minimum number of PRBs required to transmit the DCI to the UE.

The resource elements may be grouped into two or more resource partitions in each PRB, and the EPDCCH is then distributed across the resource partitions in each of the physical resource blocks. The resource partitions may be CCEs or REGs, for example. The resource partitions may be restricted to one PRB for localized EPDCCH transmission, but may span over multiple PRBs for distributed EPDCCH transmission.

Resource elements in each PRB may be excluded from transmitting EPDCCH if they are used for demodulation reference signals or channel state information reference signals or cell-specific reference signals.

FIG. 8 is a flowchart illustrating a method or process for receiving EPDCCH in PRBs at a UE according to one embodiment. In step 801, transmissions are received from a base station. In step 802, the enhanced physical downlink control channel information is extracted from resource elements in the transmissions. In step 803, the EPDCCH information from multiple resource elements in one or more PRBs is combined to identifying DCI.

The user equipment may be configured to semi-statically monitor localized EPDCCH information, or may be semi-statically configured to monitor distributed EPDCCH information. The user equipment may also be configured to monitor both localized and distributed enhanced physical downlink control channel information in different search spaces.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method comprising:
   performing by a processor in a base station,
   identifying downlink control information to be transmitted to user equipment in an enhanced physical downlink control channel;
   configuring a set of physical resource blocks to be used as enhanced physical downlink control channel resources by the base station; and
   mapping the enhanced physical downlink control channel across resource elements in a subset of physical resource blocks in the configured set of physical resource blocks, wherein the mapping includes:
   grouping the resource elements into two or more resource partitions in each physical resource block; and
   distributing the enhanced physical downlink control channel across the resource partitions in a subset of physical resource blocks in the configured set of physical resource blocks.

2. The method of claim 1, wherein the downlink control information is transmitted using two or more physical resource blocks even if a single physical resource block is sufficient for transmitting the downlink control information.

3. The method of claim 1, wherein at least one physical resource block contains at least a part of each of two or more enhanced physical downlink control channels.

4. The method of claim 1, wherein a subset of physical resource blocks used for transmission of the downlink control information is limited to a minimum number of physical resource blocks required to transmit the downlink control information to the user equipment.

5. The method of claim 1, wherein the resource partitions are control channel elements or resource element groups.

6. The method of claim 1, wherein each resource partition is restricted to one physical resource block for localized enhanced physical downlink control channel transmission, and wherein each resource partition is allowed to span over multiple physical resource blocks for distributed enhanced physical downlink control channel transmission.

7. A method comprising:
   performing by a processor in a base station,
   identifying downlink control information to be transmitted to user equipment in an enhanced physical downlink control channel;
   configuring a set of physical resource blocks to be used as enhanced physical downlink control channel resources by the base station; and
   mapping the enhanced physical downlink control channel across resource elements in a subset of physical resource blocks in the configured set of physical resource blocks, wherein the mapping includes:
   excluding resource elements that may be used for demodulation reference signals by any UE in each of the set of physical resource blocks from the resource elements used to transmit the enhanced physical downlink control channel.

8. A method comprising:
   performing by a processor in a base station,
   identifying downlink control information to be transmitted to user equipment in an enhanced physical downlink control channel;
   configuring a set of physical resource blocks to be used as enhanced physical downlink control channel resources by the base station; and
   mapping the enhanced physical downlink control channel across resource elements in a subset of physical resource blocks in the configured set of physical resource blocks, wherein the mapping includes:
   excluding resource elements that may be used for channel state information reference signals or cell-specific reference signals or Physical Downlink Control Channels in each of the set of physical resource blocks from the resource elements used to transmit the enhanced physical downlink control channel.

9. A method comprising:
   performing by user equipment,
   receiving transmissions from a base station;
   extracting enhanced physical downlink control channel information from resource elements in the transmissions, wherein extracting includes excluding resource elements that may be used for demodulation reference signals in physical resource blocks from the resource elements used for extracting the enhanced physical downlink control channel; and
   combining the enhanced physical downlink control channel information from resource elements in one or more physical resource blocks to identify downlink control information.

10. The method of claim 9, further comprising:
    monitoring both localized and distributed enhanced physical downlink control channel information.

11. A method comprising:
    performing by user equipment,
    receiving transmissions from a base station;
    extracting enhanced physical downlink control channel information from resource elements in the transmissions; and
    combining the enhanced physical downlink control channel information from resource elements in one or more physical resource blocks to identify downlink control information,
    wherein the user equipment is semi-statically configured to monitor enhanced physical downlink control channel information carried within a localized transmission.

12. A method comprising:
    performing by user equipment,
    receiving transmissions from a base station;
    extracting enhanced physical downlink control channel information from resource elements in the transmissions; and
    combining the enhanced physical downlink control channel information from resource elements in one or more physical resource blocks to identify downlink control information, wherein the user equipment is semi-statically configured to monitor enhanced physical downlink control channel information carried within a distributed transmission.

13. A method comprising:

performing by user equipment, receiving transmissions from a base station;

extracting enhanced physical downlink control channel information from resource elements in the transmissions, wherein extracting includes excluding resource elements that may be used for channel state information reference signals or cell-specific reference signals or Physical Downlink Control Channels in physical resource blocks from the resource elements used for extracting the enhanced physical downlink control channel; and combining the enhanced physical downlink control channel information from resource elements in one or more physical resource blocks to identify downlink control information.

* * * * *